(12) United States Patent
Amundson et al.

(10) Patent No.: US 7,859,637 B2
(45) Date of Patent: Dec. 28, 2010

(54) USE OF A STORAGE CAPACITOR TO ENHANCE THE PERFORMANCE OF AN ACTIVE MATRIX DRIVEN ELECTRONIC DISPLAY

(75) Inventors: Karl R. Amundson, Cambridge, MA (US); Paul S. Drzaic, Morgan Hill, CA (US); Peter T. Kazlas, Sudbury, MA (US)

(73) Assignee: E Ink Corporation, Cambridge, MA (US)

( * ) Notice: Subject to any disclaimer, the term of this patent is extended or adjusted under 35 U.S.C. 154(b) by 442 days.

(21) Appl. No.: 11/612,509

(22) Filed: Dec. 19, 2006

(65) Prior Publication Data

US 2007/0085818 A1 Apr. 19, 2007

Related U.S. Application Data

(63) Continuation of application No. 10/886,803, filed on Jul. 8, 2004, now Pat. No. 7,176,880, which is a continuation of application No. 09/621,745, filed on Jul. 21, 2000, now abandoned.

(60) Provisional application No. 60/144,911, filed on Jul. 21, 1999.

(51) Int. Cl.
 *C09K 19/52* (2006.01)
(52) U.S. Cl. ..................................... 349/163
(58) Field of Classification Search .............. 349/38–39
 See application file for complete search history.

(56) References Cited

U.S. PATENT DOCUMENTS

| | | | |
|---|---|---|---|
| 3,036,388 A | 5/1962 | Tate | |
| 3,384,488 A | 5/1968 | Tulagin et al. | |
| 3,612,758 A | 10/1971 | Evans et al. | |
| 3,668,106 A | 6/1972 | Ota | |
| 3,670,323 A | 6/1972 | Sobel et al. | |
| 3,756,693 A | 9/1973 | Ota | |
| 3,767,392 A | 10/1973 | Ota | |
| 3,792,308 A | 2/1974 | Ota | |
| 3,806,893 A | 4/1974 | Ohnishi et al. | |
| 3,850,627 A | 11/1974 | Wells et al. | |
| 3,870,517 A | 3/1975 | Ota et al. | |

(Continued)

FOREIGN PATENT DOCUMENTS

DE 44 31 441 C1 2/1996

(Continued)

OTHER PUBLICATIONS

Antia, M., "Switchable Reflections Make Electronic Ink", Science, 285, 658 (1999).

(Continued)

*Primary Examiner*—James A Dudek
(74) *Attorney, Agent, or Firm*—David J. Cole

(57) ABSTRACT

A system and method of use of a storage capacitor to improve the appearance and addressing characteristics of an electronically driven display. The capacitor is formed by the overlap of portions of electrodes used to address different pixels, or by the overlap of an addressing line and a conductor. An insulator layer situated between the capacitor electrodes can be the same insulator layer present in an FET transistor used to address the pixel. Methods of use of capacitors to achieve improved display addressing are disclosed.

15 Claims, 7 Drawing Sheets

U.S. PATENT DOCUMENTS

| | | |
|---|---|---|
| 3,892,568 A | 7/1975 | Ota |
| 3,972,040 A | 7/1976 | Hilsum et al. |
| 4,041,481 A | 8/1977 | Sato |
| 4,045,327 A | 8/1977 | Noma et al. |
| 4,068,927 A | 1/1978 | White |
| 4,071,430 A | 1/1978 | Liebert |
| 4,088,395 A | 5/1978 | Gigila |
| 4,123,346 A | 10/1978 | Ploix |
| 4,149,149 A | 4/1979 | Miki et al. |
| 4,203,106 A | 5/1980 | Dalisa et al. |
| 4,218,302 A | 8/1980 | Dalisa et al. |
| 4,261,653 A | 4/1981 | Goodrich |
| 4,305,807 A | 12/1981 | Somlyody |
| 4,311,361 A | 1/1982 | Somlyody |
| 4,324,456 A | 4/1982 | Dalisa |
| 4,390,403 A | 6/1983 | Batchelder |
| 4,418,346 A | 11/1983 | Batchelder |
| 4,430,648 A | 2/1984 | Togashi et al. |
| 4,439,507 A | 3/1984 | Pan et al. |
| 4,450,440 A | 5/1984 | White |
| 4,522,472 A | 6/1985 | Liebert et al. |
| 4,582,395 A * | 4/1986 | Morozumi ............... 349/43 |
| 4,598,960 A | 7/1986 | DiSanto et al. |
| 4,643,528 A | 2/1987 | Bell, Jr. |
| 4,648,956 A | 3/1987 | Marshall et al. |
| 4,655,897 A | 4/1987 | DiSanto et al. |
| 4,686,524 A | 8/1987 | White |
| 4,716,403 A * | 12/1987 | Morozumi ............... 345/88 |
| 4,732,830 A | 3/1988 | DiSanto et al. |
| 4,741,604 A | 5/1988 | Kornfeld |
| 4,742,345 A | 5/1988 | DiSanto et al. |
| 4,746,917 A | 5/1988 | DiSanto et al. |
| 4,776,675 A | 10/1988 | Takaochi et al. |
| 4,833,464 A | 5/1989 | DiSanto et al. |
| 4,846,931 A | 7/1989 | Gmitter et al. |
| 4,850,919 A | 7/1989 | DiSanto et al. |
| 4,883,561 A | 11/1989 | Gmitter et al. |
| 4,892,607 A | 1/1990 | DiSanto et al. |
| 4,931,019 A | 6/1990 | Park |
| 4,947,157 A | 8/1990 | DiSanto et al. |
| 4,947,159 A | 8/1990 | DiSanto et al. |
| 5,008,590 A | 4/1991 | Huisman et al. |
| 5,009,490 A | 4/1991 | Kuono et al. |
| 5,028,841 A | 7/1991 | DiSanto et al. |
| 5,041,824 A | 8/1991 | DiSanto et al. |
| 5,053,763 A | 10/1991 | DiSanto et al. |
| 5,054,887 A * | 10/1991 | Kato et al. ............... 349/42 |
| 5,066,105 A | 11/1991 | Yoshimoto et al. |
| 5,066,946 A | 11/1991 | DiSanto et al. |
| 5,070,326 A | 12/1991 | Yoshimoto et al. |
| 5,077,157 A | 12/1991 | DiSanto et al. |
| 5,087,113 A * | 2/1992 | Sakono et al. ............... 349/39 |
| 5,105,185 A | 4/1992 | Nakanowatari et al. |
| 5,119,218 A | 6/1992 | Yoshimoto et al. |
| 5,128,226 A | 7/1992 | Hung |
| 5,128,785 A | 7/1992 | Yoshimoto et al. |
| 5,151,806 A * | 9/1992 | Kawamoto et al. ............. 349/39 |
| 5,161,007 A | 11/1992 | Takanashi et al. |
| 5,174,882 A | 12/1992 | DiSanto et al. |
| 5,177,476 A | 1/1993 | DiSanto et al. |
| 5,187,609 A | 2/1993 | DiSanto et al. |
| 5,194,852 A | 3/1993 | More |
| 5,206,749 A | 4/1993 | Zavracky et al. |
| 5,216,416 A | 6/1993 | DiSanto et al. |
| 5,220,316 A | 6/1993 | Kazan |
| 5,223,115 A | 6/1993 | DiSanto et al. |
| 5,223,823 A | 6/1993 | DiSanto et al. |
| 5,234,541 A | 8/1993 | Shannon et al. |
| 5,247,290 A | 9/1993 | Di Santo et al. |
| 5,250,932 A | 10/1993 | Yoshimoto et al. |
| 5,250,938 A | 10/1993 | DiSanto et al. |
| 5,254,981 A | 10/1993 | DiSanto et al. |
| 5,266,937 A | 11/1993 | DiSanto et al. |
| 5,270,843 A | 12/1993 | Wang |
| 5,276,438 A | 1/1994 | DiSanto et al. |
| 5,279,694 A | 1/1994 | DiSanto et al. |
| 5,293,528 A | 3/1994 | DiSanto et al. |
| 5,296,974 A | 3/1994 | Tada et al. |
| 5,302,235 A | 4/1994 | DiSanto et al. |
| 5,303,073 A | 4/1994 | Shirota et al. |
| 5,304,439 A | 4/1994 | Disanto et al. |
| 5,315,312 A | 5/1994 | DiSanto et al. |
| 5,345,251 A | 9/1994 | DiSanto et al. |
| 5,357,355 A | 10/1994 | Arai |
| 5,359,346 A | 10/1994 | DiSanto et al. |
| 5,362,671 A | 11/1994 | Zavracky |
| 5,383,008 A | 1/1995 | Sheridon |
| 5,389,945 A | 2/1995 | Sheridon |
| 5,402,145 A | 3/1995 | DiSanto et al. |
| 5,411,656 A | 5/1995 | Schubert |
| 5,412,398 A | 5/1995 | DiSanto et al. |
| 5,447,810 A | 9/1995 | Chen et al. |
| 5,460,688 A | 10/1995 | DiSanto et al. |
| 5,463,492 A | 10/1995 | Check, III |
| 5,467,107 A | 11/1995 | DiSanto et al. |
| 5,499,038 A | 3/1996 | DiSanto et al. |
| 5,508,720 A | 4/1996 | DiSanto et al. |
| 5,543,589 A | 8/1996 | Buchana et al. |
| 5,545,291 A | 8/1996 | Smith et al. |
| 5,561,443 A | 10/1996 | DiSanto et al. |
| 5,565,885 A | 10/1996 | Tamanoi |
| 5,575,554 A | 11/1996 | Guritz |
| 5,583,675 A | 12/1996 | Yamada et al. |
| 5,602,572 A | 2/1997 | Rylander |
| 5,606,194 A | 2/1997 | Lebrum et al. |
| 5,609,978 A | 3/1997 | Giorgianni et al. |
| 5,614,340 A | 3/1997 | Bugner et al. |
| 5,623,585 A | 4/1997 | Matias et al. |
| 5,625,460 A | 4/1997 | Tai |
| 5,627,561 A | 5/1997 | Laspina et al. |
| 5,638,103 A | 6/1997 | Obata et al. |
| 5,641,974 A | 6/1997 | den Boer et al. |
| 5,648,801 A | 7/1997 | Beardsley et al. |
| 5,650,199 A | 7/1997 | Chang et al. |
| 5,650,247 A | 7/1997 | Taniguchi et al. |
| 5,650,872 A | 7/1997 | Saxe et al. |
| 5,675,719 A | 10/1997 | Matias et al. |
| 5,684,365 A | 11/1997 | Tang et al. |
| 5,684,501 A | 11/1997 | Knapp et al. |
| 5,686,383 A | 11/1997 | Long et al. |
| 5,688,584 A | 11/1997 | Casson et al. |
| 5,689,282 A | 11/1997 | Wolfs et al. |
| 5,699,102 A | 12/1997 | Ng et al. |
| 5,707,738 A | 1/1998 | Hou |
| 5,714,051 A | 2/1998 | Van Leth et al. |
| 5,715,511 A | 2/1998 | Aslam et al. |
| 5,715,514 A | 2/1998 | Williams et al. |
| 5,717,515 A | 2/1998 | Sheridon |
| 5,718,996 A | 2/1998 | Iijima et al. |
| 5,721,042 A | 2/1998 | Iijima et al. |
| 5,725,935 A | 3/1998 | Rajan |
| 5,729,663 A | 3/1998 | Lin et al. |
| 5,731,116 A | 3/1998 | Matsuo et al. |
| 5,737,115 A | 4/1998 | Mackinlay et al. |
| 5,738,977 A | 4/1998 | Van Der Sluis-Van Der Voort et al. |
| 5,739,801 A | 4/1998 | Sheridon |
| 5,740,495 A | 4/1998 | Maher et al. |
| 5,744,283 A | 4/1998 | Spierings et al. |
| 5,745,094 A | 4/1998 | Gordon, II et al. |
| 5,750,238 A | 5/1998 | Iijima et al. |
| 5,760,761 A | 6/1998 | Sheridon |
| 5,777,782 A | 7/1998 | Sheridon |
| 5,783,856 A | 7/1998 | Smith et al. |

| | | | | | | |
|---|---|---|---|---|---|---|
| 5,784,190 | A | 7/1998 | Worley | 6,445,489 | B1 | 9/2002 | Jacobson et al. |
| 5,786,875 | A | 7/1998 | Brader et al. | 6,459,418 | B1 | 10/2002 | Comiskey et al. |
| 5,808,783 | A | 9/1998 | Crowley | 6,473,072 | B1 | 10/2002 | Comiskey et al. |
| 5,824,186 | A | 10/1998 | Smith et al. | 6,493,396 | B1 | 12/2002 | Nguyen et al. |
| 5,852,427 | A | 12/1998 | Buzak | 6,504,524 | B1 | 1/2003 | Gates et al. |
| 5,872,552 | A | 2/1999 | Gordon, II et al. | 6,506,438 | B2 | 1/2003 | Duthaler et al. |
| 5,892,504 | A | 4/1999 | Knapp | 6,512,354 | B2 | 1/2003 | Jacobson et al. |
| 5,894,367 | A * | 4/1999 | Sheridon .................. 359/623 | 6,515,649 | B1 | 2/2003 | Albert et al. |
| 5,898,416 | A | 4/1999 | Kuijk et al. | 6,518,949 | B2 | 2/2003 | Drzaic |
| 5,904,545 | A | 5/1999 | Smith et al. | 6,531,997 | B1 | 3/2003 | Gates et al. |
| 5,930,026 | A | 7/1999 | Jacobson et al. | 6,639,578 | B1 | 10/2003 | Comiskey et al. |
| 5,936,259 | A | 8/1999 | Katz et al. | 6,664,944 | B1 | 12/2003 | Albert et al. |
| 5,961,804 | A | 10/1999 | Jacobson et al. | 6,672,921 | B1 | 1/2004 | Liang et al. |
| 5,969,376 | A | 10/1999 | Bao | 6,680,725 | B1 | 1/2004 | Jacobson |
| 5,972,493 | A | 10/1999 | Iwasaki et al. | 6,693,620 | B1 | 2/2004 | Herb et al. |
| 5,980,763 | A | 11/1999 | Young | 6,710,540 | B1 | 3/2004 | Albert et al. |
| 6,005,791 | A | 12/1999 | Gudesen et al. | 6,724,519 | B1 | 4/2004 | Comiskey et al. |
| 6,005,817 | A | 12/1999 | Gudesen et al. | 6,727,881 | B1 | 4/2004 | Albert et al. |
| 6,017,584 | A | 1/2000 | Albert et al. | 6,727,882 | B1 | 4/2004 | Large et al. |
| 6,045,955 | A | 4/2000 | Vincent | 6,765,617 | B1 | 7/2004 | Tangen et al. |
| 6,052,354 | A | 4/2000 | Gudesen et al. | 6,787,825 | B1 | 9/2004 | Gudeson et al. |
| 6,054,071 | A | 4/2000 | Mikkelsen, Jr. | 6,825,829 | B1 | 11/2004 | Albert et al. |
| 6,055,091 | A | 4/2000 | Sheridon et al. | 6,839,158 | B2 | 1/2005 | Albert et al. |
| 6,055,180 | A | 4/2000 | Gudesen et al. | 6,897,855 | B1 | 5/2005 | Matthies et al. |
| 6,067,185 | A | 5/2000 | Albert et al. | 2002/0113770 | A1 | 8/2002 | Jacobson et al. |
| 6,084,850 | A | 7/2000 | Gudesen et al. | 2004/0119681 | A1 | 6/2004 | Albert et al. |
| 6,087,519 | A | 7/2000 | Garnier et al. | | | | |
| 6,088,319 | A | 7/2000 | Gudesen | | | | |

FOREIGN PATENT DOCUMENTS

| | | |
|---|---|---|
| DE | 195 00 694 | 8/1996 |
| EP | 0 404 545 A2 | 12/1990 |
| EP | 0 443 571 A2 | 8/1991 |
| EP | 0 618 715 A1 | 10/1994 |
| EP | 0 709 713 A2 | 5/1996 |
| GB | 2 149 548 A | 6/1985 |
| GB | 2 306 229 A | 4/1997 |
| GB | 1 314 906 | 5/2003 |
| JP | 54-111368 A | 8/1979 |
| JP | 55-096922 A | 7/1980 |
| JP | 62-058222 A | 3/1987 |
| JP | 62-231930 A | 10/1987 |
| JP | 64-086116 | 3/1989 |
| JP | 03-053114 A | 3/1991 |
| JP | 03-053224 A | 3/1991 |
| JP | 03-091722 A | 4/1991 |
| JP | 03-096925 A | 4/1991 |
| JP | 05-061421 A | 3/1993 |
| JP | 06-202168 A | 7/1994 |
| JP | 07-036020 A | 2/1995 |
| JP | 09-006277 A | 1/1997 |
| JP | 09-185087 A | 7/1997 |
| JP | 09-230391 A | 9/1997 |
| JP | 10-048673 A | 2/1998 |
| JP | 10-149118 A | 6/1998 |
| JP | 10-161161 A | 6/1998 |
| JP | 11-202804 A | 7/1999 |
| JP | 11-212499 A | 8/1999 |
| JP | 11-219135 A | 8/1999 |
| JP | 11-264812 A | 9/1999 |
| JP | 2000-162650 | 6/2000 |
| JP | 2000-194020 | 7/2000 |
| WO | WO 95/06307 | 3/1995 |
| WO | WO 99/20682 | 4/1999 |
| WO | WO 99/41788 | 8/1999 |
| WO | WO 00/05704 | 2/2000 |
| WO | WO 00/36560 | 6/2000 |
| WO | WO 00/38000 | 6/2000 |

| | | | |
|---|---|---|---|
| 6,091,382 | A | 7/2000 | Shioya et al. |
| 6,097,531 | A | 8/2000 | Sheridon |
| 6,118,426 | A | 9/2000 | Albert et al. |
| 6,120,588 | A | 9/2000 | Jacobson |
| 6,120,839 | A | 9/2000 | Comiskey et al. |
| 6,124,851 | A | 9/2000 | Jacobson |
| 6,128,124 | A | 10/2000 | Silverman |
| 6,130,773 | A | 10/2000 | Jacobson et al. |
| 6,130,774 | A | 10/2000 | Albert et al. |
| 6,137,467 | A | 10/2000 | Sheridon et al. |
| 6,140,980 | A | 10/2000 | Spitzer et al. |
| 6,144,361 | A | 11/2000 | Gordon, II et al. |
| 6,147,791 | A | 11/2000 | Sheridon |
| 6,172,798 | B1 | 1/2001 | Albert et al. |
| 6,177,921 | B1 | 1/2001 | Comiskey et al. |
| 6,184,856 | B1 | 2/2001 | Gordon, II et al. |
| 6,215,130 | B1 | 4/2001 | Dodabalapur |
| 6,219,160 | B1 | 4/2001 | Nordal et al. |
| 6,225,971 | B1 | 5/2001 | Gordon, II et al. |
| 6,232,950 | B1 | 5/2001 | Albert et al. |
| 6,239,896 | B1 | 5/2001 | Ikeda |
| 6,241,921 | B1 | 6/2001 | Jacobson et al. |
| 6,249,271 | B1 | 6/2001 | Albert et al. |
| 6,252,564 | B1 | 6/2001 | Albert et al. |
| 6,262,706 | B1 | 7/2001 | Albert et al. |
| 6,262,833 | B1 | 7/2001 | Loxley et al. |
| 6,271,823 | B1 | 8/2001 | Gordon, II et al. |
| 6,278,131 | B1 | 8/2001 | Yamazaki et al. |
| 6,300,932 | B1 | 10/2001 | Albert |
| 6,301,038 | B1 | 10/2001 | Fitzmaurice et al. |
| 6,312,304 | B1 | 11/2001 | Duthaler et al. |
| 6,323,989 | B1 | 11/2001 | Jacobson et al. |
| 6,327,072 | B1 | 12/2001 | Comiskey et al. |
| 6,343,164 | B1 | 1/2002 | Robertsson et al. |
| 6,359,605 | B1 | 3/2002 | Knapp et al. |
| 6,370,019 | B1 | 4/2002 | Matthies et al. |
| 6,373,454 | B1 | 4/2002 | Knapp et al. |
| 6,373,461 | B1 | 4/2002 | Hasegawa et al. |
| 6,376,828 | B1 | 4/2002 | Comiskey |
| 6,377,387 | B1 | 4/2002 | Duthaler et al. |
| 6,392,785 | B1 | 5/2002 | Albert et al. |
| 6,392,786 | B1 | 5/2002 | Albert |
| 6,403,396 | B1 | 6/2002 | Gudesen et al. |
| 6,422,687 | B1 | 7/2002 | Jacobson |
| 6,432,739 | B1 | 8/2002 | Gudesen et al. |

OTHER PUBLICATIONS

Blazo, S.F., "High Resolution Electrophoretic Display with Photoconductor Addressing", SID Digest 1982, p. 152.

Bohnke et al., "Polymer-Based Solid Electrochromic Cell for Matrix-Addressable Display Devices." J. Electrochem. Soc., 138, 3612 (1991).

Chiang, A., "Reduction of Lateral Migration in Matrix Addressed Electrophoretic Display", Xerox Disclosure Journal, 5, 73 (1980).

Chiang, A., et al., "A Stylus Writable Electrophoretic Display Device", SID 79 Digest (1979), 44.

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Dabbousi, B.O., et al., "Electroluminescence from CdSe quantum-dot/polymer composites", Appl. Phys. Lett., 66, 1316 (1995).

Dalisa, A., "Electrophoretic Display Technology", Proceedings of the SID (1977).

Drzaic, P., et al., "A Printed and Rollable Bistable Electronic Display", SID 98 Digest (1998), p. 1131.

Hopper, M.A., et al., "An Electrophoretic Display, Its Properties, Model and Addressing", IEEE Trans. Electron Dev., ED-26, 1148 (1979).

Hosaka, H., et al., "Electromagnetic microrelays: concepts and fundamental characteristics", Sensors and Actuators A, 40, 41 (1994).

Huang, J., et al., "Photoluminescence and electroluminescence of ZnS:Cu nanocrystals in polymeric networks", Appl. Phys. Lett., 70, 2335 (1997).

Jacobson, J., et al., "The last book", IBM Systems J., 36, 457 (1997).

Kornfeld, A Defect-Tolerant Active-Matrix Electrophoretic Display, SID Digest, 1984, p. 142.

Moesner, F.M., et al., "Devices for Particle Handling by an AC Electric Field", IEEE, 1995, p. 66.

Murau, P., "Characteristics of an X-Y Addressed Electrophoretic Image Display (EPID)," SID 84 Digest (1984) p. 141.

Nakamura, E., et al., "Development of Electrophoretic Display Using Microcapsulated Suspension," SID 98 Digest (1998), p. 1014.

O'Regan, B. et al., "A Low Cost, High-efficiency Solar Cell Based on Dye-sensitized colloidal $TiO_2$ Films", Nature, vol. 353, Oct. 24, 1991, 773-740.

Ota, I., et al., "Developments in Electrophoretic Displays", Proceedings of the SID, 18, 243 (1977).

Ota, I., et al., "Electrophoretic display devices", Laser 75 Optoelectronics Conference Proceedings, 145 (1975).

Ota, I., et al., "Electrophoretic Image Display (EPID) Panel", Proceedings of the IEEE, 61, 832 (1973).

Quon, W.S., "Multilevel Voltage Select (MLVS): A Novel Technique to X-Y Address an Electrophoretic Display", Correspondence, 1977, pp. 1120-1123.

Ridley, B.A. et al., "All-Inorganic Field Effect Transistors by Printing," Science, 286, 746 (1999).

Saitoh, M., et al., "A newly developed electrical twisting ball display", Proceedings of the SID, 23, 249 (1982).

Sheridon, N.K., et al., "A Photoconductor-Addressed Electrophoretic Cell for Office Data Display", SID 82 Digest, 94 (1982).

Shiffman, R.R., et al., "An Electrophoretic Image Display with Internal NMOS Address Logic and Display Drivers," Proceedings of the SID, 1984, vol. 25, 105 (1984).

Singer, B., et al., "An X-Y Addressable Electrophoretic Display," Proceedings of the SID, 18, 255 (1977).

Vance, D.W., "Optical Characteristics of Electrophoretic Displays", Proceedings of the SID, 18, 267 (1977).

Vaz, N.A., et al., "Dual-frequency addressing of polymer-dispersed liquid-crystal films", J. Appl. Phys., 65, 5043 (1989).

White, R., "An Electrophoretic Bar Graph Display," Proceedings of the SID, 22, 173 (1981).

Yamaguchi, M., et al., "Equivalent Circuit of Ion Projection-Driven Electrophoretic Display," IEICE Transactions, 74, 4152 (1991).

* cited by examiner

USE OF A STORAGE CAPACITOR TO ENHANCE THE PERFORMANCE OF AN ACTIVE MATRIX DRIVEN ELECTRONIC DISPLAY

REFERENCE TO RELATED APPLICATIONS

This application is a continuation of Application Ser. No. 10/886,803, filed Jul. 8, 2004 (Publication No. 2004/0239614, now U.S. Pat. No. 7,176,880), which in turn is a continuation of application Ser. No. 09/621,745, filed Jul. 21, 2000 (now abandoned), which claims the benefit of U.S. provisional patent Application Ser. No. 60/144,911, filed Jul. 21, 1999, which application is incorporated herein in its entirety by reference.

BACKGROUND OF INVENTION

This invention relates generally to systems and methods for addressing an electronic display. More particularly, the invention relates to designs for active matrix backplanes that use a capacitor at each pixel electrode for driving an electronic display.

In an active matrix display, to address a pixel, a voltage is delivered to a pixel by addressing the gate (or select) line for that pixel as well as applying a voltage on the data line for that pixel. The pixel is charged up to a voltage approaching the corresponding data line voltage. After addressing the pixel, the voltage decays due to leakage through the pixel as well as through the thin-film transistor attached to the pixel. Therefore, the pixel does not experience the full voltage drop across its thickness for the entire time between addressing events. In fact, the voltage across the pixel may drop quite considerably between addressing events. This is undesirable because the optical response of the electro-optical medium is slower when the time-average voltage across the pixel is smaller. Also, the optical saturation will generally be smaller when the time-averaged voltage across the pixel is reduced.

SUMMARY OF THE INVENTION

In one aspect, the invention features an electronic display that comprises an encapsulated display medium comprising a plurality of pixels. The electronic display includes a transistor having a data electrode, a gate electrode and a pixel electrode and comprising a layer of insulating material situated between a first layer of conductive material that forms the gate electrode and a second layer of conductive material that forms the data and pixel electrodes. The data and pixel electrodes form the source and drain of the transistor. With field-effect transistors (FETs), either the source or the drain may be connected to the pixel, although typically it is the transistor source which is connected to the pixel. The transistor applies an addressing voltage to one of the pixels via the transistor pixel electrode. The electronic display includes a storage capacitor comprising a layer of insulating material situated between a first layer of conductive material and a second layer of conductive material. The storage capacitor is in electrical communication with the pixel addressed by the transistor for reducing a rate of voltage decay across the pixel. The encapsulated display medium can include electrophoretic particles or needles dispersed in a fluid, or can be bichromal spheres.

In one embodiment, one of the layers of material comprising the transistor and a respective layer of material comprising the storage capacitor comprise a continuous layer of material. In another embodiment, one of the conductors making up the storage capacitor is in electrical communication with a gate line electrode that is not used to address the pixel associated with the storage capacitor, but is adjacent to the pixel. In another embodiment, the storage capacitor is in electrical communication with a conductor that is not connected to any of the gate or data lines. This conductor could be held at a fixed voltage or electronically tied to the front (common plane) electrode of the display.

In one embodiment, the storage capacitor comprises a storage capacitor pixel electrode, an insulator disposed adjacent the pixel electrode and a storage capacitor gate electrode disposed adjacent the insulator. The insulator can be patterned. Alternatively, the insulator is unpatterned.

In one embodiment, the storage capacitor comprises a pixel electrode, an insulator disposed adjacent the pixel electrode and a gate electrode disposed adjacent the insulator. In one embodiment, the storage capacitor comprises a pixel electrode, a semiconductor disposed adjacent the pixel electrode, an insulator disposed adjacent the semiconductor, and a gate electrode disposed adjacent the insulator. In another embodiment, the storage capacitor comprises a pixel electrode, an insulator disposed adjacent the pixel electrode and a conductor disposed adjacent the insulator. In still another embodiment, the insulator forms a part of the storage capacitor and the transistor.

In one embodiment, a capacitance of the storage capacitor is greater than a capacitance of the pixel. In another embodiment, the voltage decay time across the pixel is approximately given by the product of $R_p$ and $(C_p+C_s)$ where $R_p$ is the resistance of the pixel, $C_p$ is the capacitance of the pixel, and $C_s$ is the capacitance of the storage capacitor.

In another embodiment, the transistor and the storage capacitor comprise a plurality of continuous layers of material.

In a further embodiment, the transistor and the storage capacitor each further comprise a layer of semiconducting material situated between the respective first layers of conductive material and the respective second layers of conductive material.

In another aspect, the invention relates to an electronic display comprising an encapsulated display medium comprising a plurality of pixels, in which each of the pixels comprises at least one capsule containing particles dispersed in a fluid. The electronic display includes a storage capacitor comprising a layer of insulating material situated between a first layer of conductive material and a second layer of conductive material. The storage capacitor is in electrical communication with one of the plurality of pixels for reducing a rate of voltage decay across the pixel.

In still another aspect, the invention relates to a method of addressing an electronic display having a display medium comprising a plurality of pixels and a plurality of storage capacitors, with at least one of the plurality of storage capacitors in electrical communication with a corresponding one of the plurality of pixels. The method comprises applying an electrical pulse to the capacitor to charge the capacitor to an addressing voltage of the corresponding pixel, the duration of the electrical pulse being insufficient in length to fully address the pixel directly, so that the pixel is addressed and presents an intended appearance after the voltage pulse ends. In one embodiment, a plurality of electrical pulses are successively applied to a plurality of capacitors, each pulse charging the respective capacitor to an addressing voltage of the corresponding pixel. In this embodiment, an individual duration of an electrical pulse is insufficient in length to fully address a pixel directly, so that the pixels are addressed and present an intended image after the voltage pulses end, with the total duration of the plurality of pulses being less than an addressing time of the electronic display.

BRIEF DESCRIPTION OF THE DRAWINGS

The objects and features of the invention can be better understood with reference to the drawings described below. The drawings are not necessarily to scale, emphasis instead generally being placed upon illustrating the principles of the invention.

FIG. 3A-3B are schematic circuit diagrams depicting various exemplary embodiments of the invention.

DETAILED DESCRIPTION

Figure 2A:
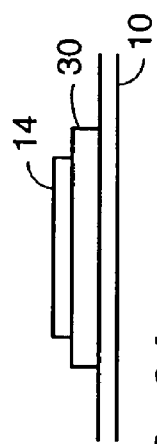
FIG. 2A-2D are elevation views of a number of illustrative embodiments of the invention.

It is generally preferred to have as large as possible of a time-average voltage across the pixel. Methods of maintaining the addressed voltage drop across a pixel during times when the pixel is not being addressed enable rapid addressing of a display. This is because if the voltage across a pixel is maintained even during the time when the pixel is not being addressed, it continues to evolve optically toward a desired state. Therefore, many rows of pixels in the display, if not all, continue to evolve in parallel when the applied voltage is significantly held. A display of this sort can be addressed much more quickly than a display where the voltage across rows of pixels had decayed to nearly zero during much of the time of the refresh cycle.

Currently, storage capacitors are used in active-matrix liquid crystal displays in order to increase the voltage holding ratio (VHR) of the pixels. The VHR is the ratio of the voltage drop across a pixel just before the next addressing event divided by the voltage across the pixel just after addressing (both voltages referenced to the front plane voltage, which is taken to be zero in this case). However, there are several distinctions for the use of capacitors in electrophoretic or rotating ball displays. First, the capacitance of a pixel in an electrophoretic display or rotating ball display is typically much smaller than a liquid crystal display of the same pixel area. This is because a pixel in an electrophoretic display or rotating ball display will typically be thicker than a liquid crystal display (which is on the order of five microns) and also the dielectric constant is typically lower than for a liquid crystal.

Secondly, electrophoretic and rotating ball displays are driven to optical states that depend upon the sign of an electric field as opposed to a liquid crystal display where the liquid crystal responds to the square of the applied voltage (and thus is independent of the sign of the voltage). In colloquial terms, the electrophoretic and rotating ball displays are "DC driven" while a liquid crystal display is "AC driven." This also means that it is advantageous to switch the voltage of the front plane of an electrophoretic or rotating ball display and this has to be considered when using a storage capacitor.

Thirdly, the goal of the storage capacitor may be different in the two cases. For a liquid crystal display, the storage capacitor is incorporated so that the voltage across the pixel during the time in which the pixel is not addressed is held close to constant, and this allows for accurate addressing of greyscale states. In the case of electrophoretic displays, the storage capacitor may be incorporated to increase the speed of addressing of the display. The speed of addressing is improved because a storage capacitor maintains voltage across a pixel for a longer time than without the storage capacitor. This means that more rows of pixels can evolve under an electric field than without the storage capacitor. In the ideal situation, the voltage is substantially maintained between row addressing events, so that the optical state across the entire display evolves simultaneously.

The present invention features the use of storage capacitors to enhance the performance of an electrophoretic or rotating ball display. Use of a storage capacitor can greatly reduce the rate of decay of the voltage across the pixel. This increases the time-averaged voltage across the pixel, for everything else remaining equal, and so increases the response speed of the electro-optical material, and perhaps increases the optical contrast between oppositely-addressed states.

In addition, the use of a storage capacitor in a "DC driven" display can also provide an advantage in the system and method by which the display is addressed. For displays such as electrophoretic displays, in which particles must move a specific distance to alter the display state of a pixel, the addressing signal (which is typically a voltage) needs to be impressed upon the pixel for a time commensurate with the traverse time of the particles. For example, if the time needed to move particles in a pixel to turn the pixel from white to black (or the reverse) is of the order of milliseconds (i.e. thousandths of a second), an applied voltage that lasts for a duration measured in units, tens or hundreds of microseconds (i.e. millionths of a second) will in general apply such a small driving impetus to the particles that they will not traverse, and the appearance of the pixel will not change significantly. However, if the driving excitation is applied to a pixel plus a storage capacitor designed so that the electric field is maintained for an extended time across the electrophoretic pixel, the field applied by the capacitor may endure for many milliseconds, even though the excitation pulse of microsecond duration has long since disappeared.

One millisecond is one thousand microseconds. A pulse requiring an interval of 1 microsecond for its application to a capacitor exhausts only $\frac{1}{1000}^{th}$ of the one millisecond time span. One can thus successively address 1000 rows of pixels in a time of the order of one millisecond using one power supply.

One controls the power supply to apply a voltage pulse and enough current to charge the pixel plus the storage capacitor to a desired voltage state, using the well-know relation that charge Q on the capacitor is equal to the voltage V times the capacitance C (and is also equal to the integral of the current i(t) with respect to time), or in the usual terminology of electrical engineering, $$Q=CV=\int i dt$$

In this example, the capacitance, C, equals the sum of the capacitances of the pixel and the storage capacitor.

Figure 1:
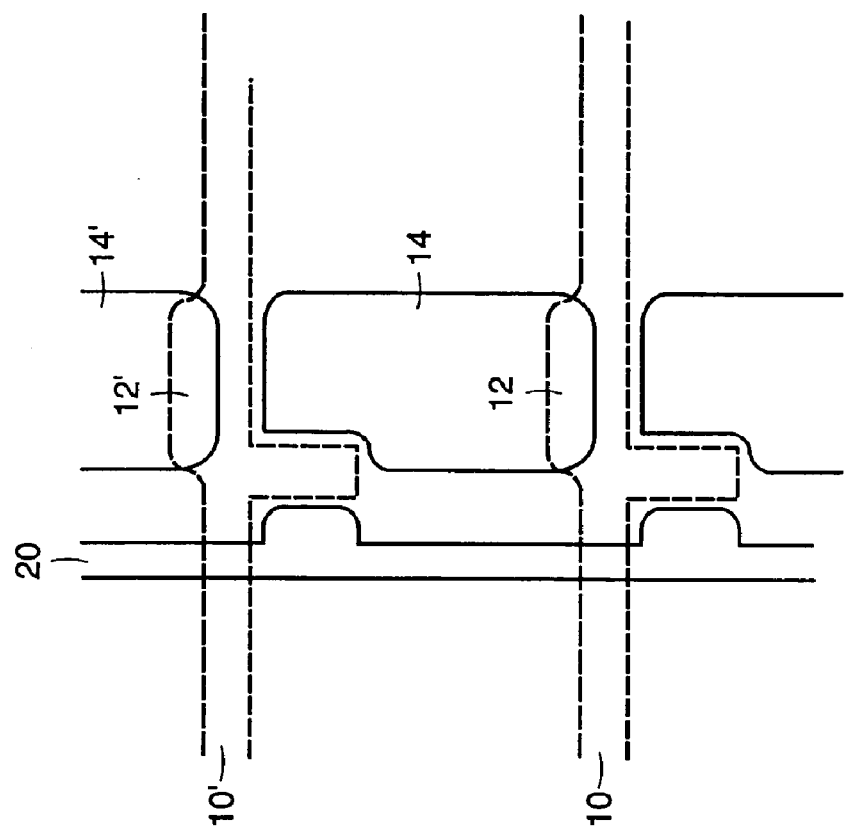
FIG. 1 is a plan view of one exemplary embodiment of the circuitry used in addressing a pixel according to principles of the invention.

A storage capacitor is a capacitor formed or defined between the pixel electrode and another electrode in the active matrix panel. The pixel electrode will be referred to as the transistor pixel electrode, and as the storage capacitor pixel electrode, as the context may require. For example, an areal overlap between the pixel electrode and an adjacent gate line not used to address the pixel under consideration (or an overlap between the pixel electrode and another conductor) can be used to define a storage capacitor. See for example FIG. 1. An insulating material is situated between these overlapping regions of these two conductive elements. This particular embodiment is illustrated in the plan view shown in FIG. 1, in which there are two gate lines 10, 10'. Gate line 10 has a region 12 that overlaps pixel electrode 14. Pixel electrode 14 corresponds to the pixel that is addressed by gate line 10', and not by gate line 10. For completeness, data line 20 is also shown. Other variations are possible.

For example, the pixel electrode 14 could partially overlap a separate conductive element that is tied to a particular voltage. In any case, it is important that the storage capacitance be at least of the order of the capacitance of the pixel, and preferably greater. That way it stores enough charge to significantly prolong the decay in the voltage drop across the pixel. At the top of FIG. 1, there is a second capacitor defined by the overlap of region 12' corresponding to gate line 10' with the partially shown pixel electrode 14'. An additional such capacitor region corresponding to 12' can be understood to be present for each gate line/pixel electrode pair along each data line of the electronic display. The first pixel or the last pixel in a row of pixels may require a separate conductive element, because there is no "next" pixel that requires a gate line. The capacitance of each such capacitor can be controlled by defining the area of overlap (and thus an area A), the thickness of the insulator (and thus the distance d between the conductors) and the material from which the insulator is fabricated (and thus the dielectric constant corresponding to the material chosen).

FIG. 2A illustrates a storage capacitor in cross section, showing the insulator 30 between the gate electrode 10 and the pixel electrode 14. The value of the storage capacitance, $C_s$, is given approximately by:

$$C_s = \in A/d$$

where $\in$ is the dielectric constant of the insulator, A is the overlapping area of the electrodes, and d is the distance between the conductors. In order to achieve a relatively large capacitance it is advantageous to use a thin insulating layer between the overlapping electrodes that make up the storage capacitor, thereby making the distance d small. Other choices that will tend to increase the capacitance are to increase the dielectric constant of the insulator, and to form a capacitor with a larger area A. However, controlling the thickness d is generally the most convenient way to control the capacitance.

Figure 2B:
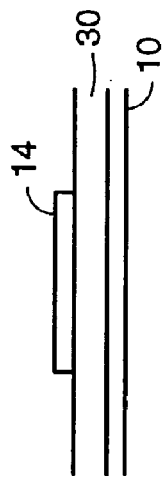

There are several ways of creating the storage capacitor. In FIG. 2B, one particularly convenient embodiment is shown in part. One can use the same dielectric (or insulator) layer 30 used in construction of the thin-film transistor as the dielectric in the storage capacitor. The pixel electrode 14 and gate electrode 10 are again shown.

Construction of such a capacitor involves depositing the gate lines 10, 10', then an unpatterned dielectric layer 30. Then, a patterned semiconductor layer 40 and data lines and pixel electrodes 14 are deposited to complete the thin film transistor. Also, the design includes an overlap 12 between the pixel electrode 14 and the adjacent gate line 10 not used to address the pixel in order to form the storage capacitor. The advantage of this design is that the dielectric layer 30 need not be patterned, but serves both as the insulator for the thin film transistor and for the storage capacitor.

Figure 2C:
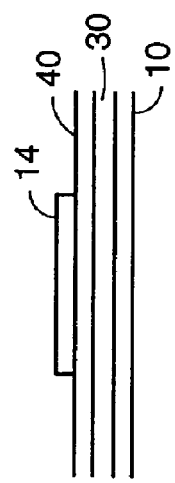

FIG. 2C depicts an embodiment in which it is desirable to not pattern the semiconductor or semiconductor contact material 40 as well. One could envision a storage capacitor made from the overlap between a pixel electrode 14 and an adjacent gate line 10 as detailed earlier, and with both the insulator 30 and active semiconductor layer 40 in between. In this scheme, one would have to make sure that leakage through the semiconductor layer 40 does not cause undesirable cross-talk between electrical components.

In another scheme, a separate insulator could be patterned over the lower electrode of the storage capacitor, then the pixel electrode overlaps over that region, thus forming the storage capacitor.

Figure 2D:
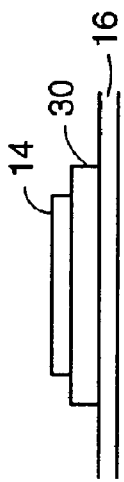

FIG. 2D shows an embodiment in which the insulator 30 is situated between the pixel electrode 14 and another conductor 16, which can for example be connected to the same voltage as the front electrode of the display, which conductor 16 overlaps with pixel electrode 14 over an area A.

Figure 3A:
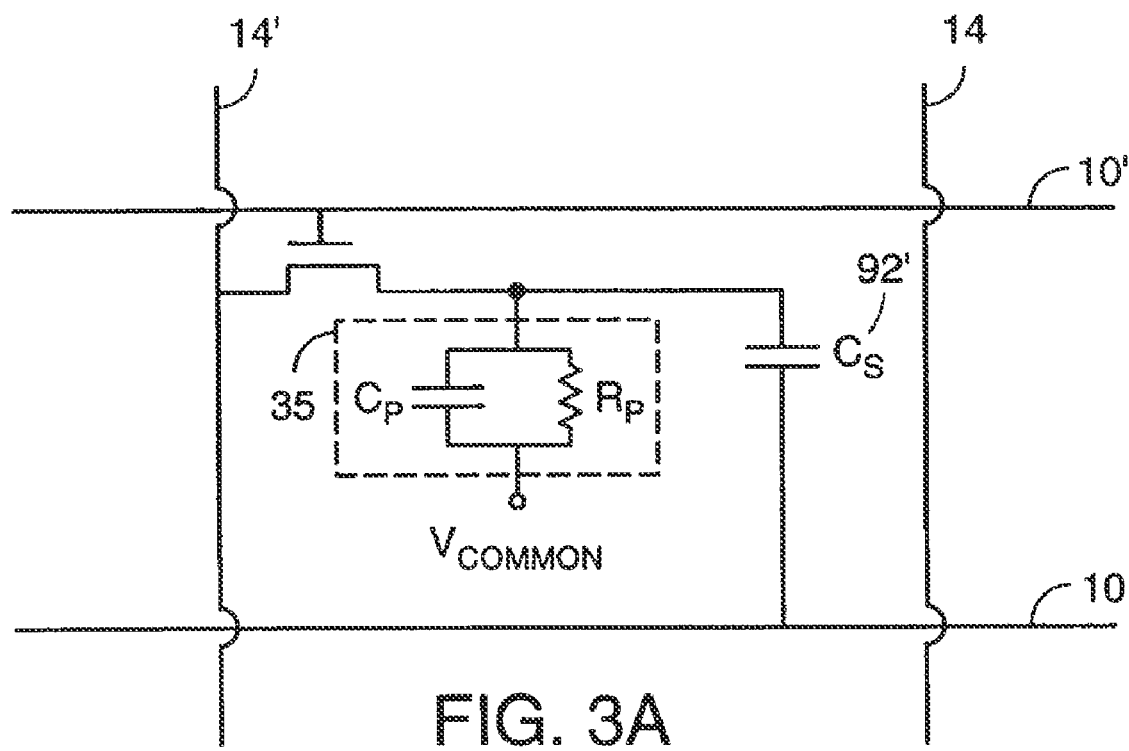

FIG. 3 illustrates the lumped circuit diagrams for two variations of the use of a storage capacitor. In one embodiment, shown in FIG. 3A, the storage capacitor 92' is tied to an adjacent gate line 10 that is not used to address the pixel under consideration, as described earlier. In another embodiment shown in FIG. 3B, the capacitor 92' is tied to a separate conductive line 16 preferably tied to a voltage that follows the front-plane voltage. The pixel 35 is represented as a parallel resistor and capacitor tied to $V_{com}$, which is the voltage of the front plane. Although this is by no means a complete model, it is useful to demonstrate the advantage of a storage capacitor. If a voltage is applied to the pixel at zero time then the transistor is brought quickly into depletion so that its resistance can be taken to be infinite (for ease of calculation), then the voltage on the pixel decays exponentially. If there were no storage capacitor, the characteristic decay time, the time span over which the voltage decays to 1/e of its initial value, is given by the RC time constant, or $R_p C_p$. Adding the storage capacitor having capacitance $C_s$ increases the voltage decay time to approximately $R_p(C_p+C_s)$.

Figure 4A:
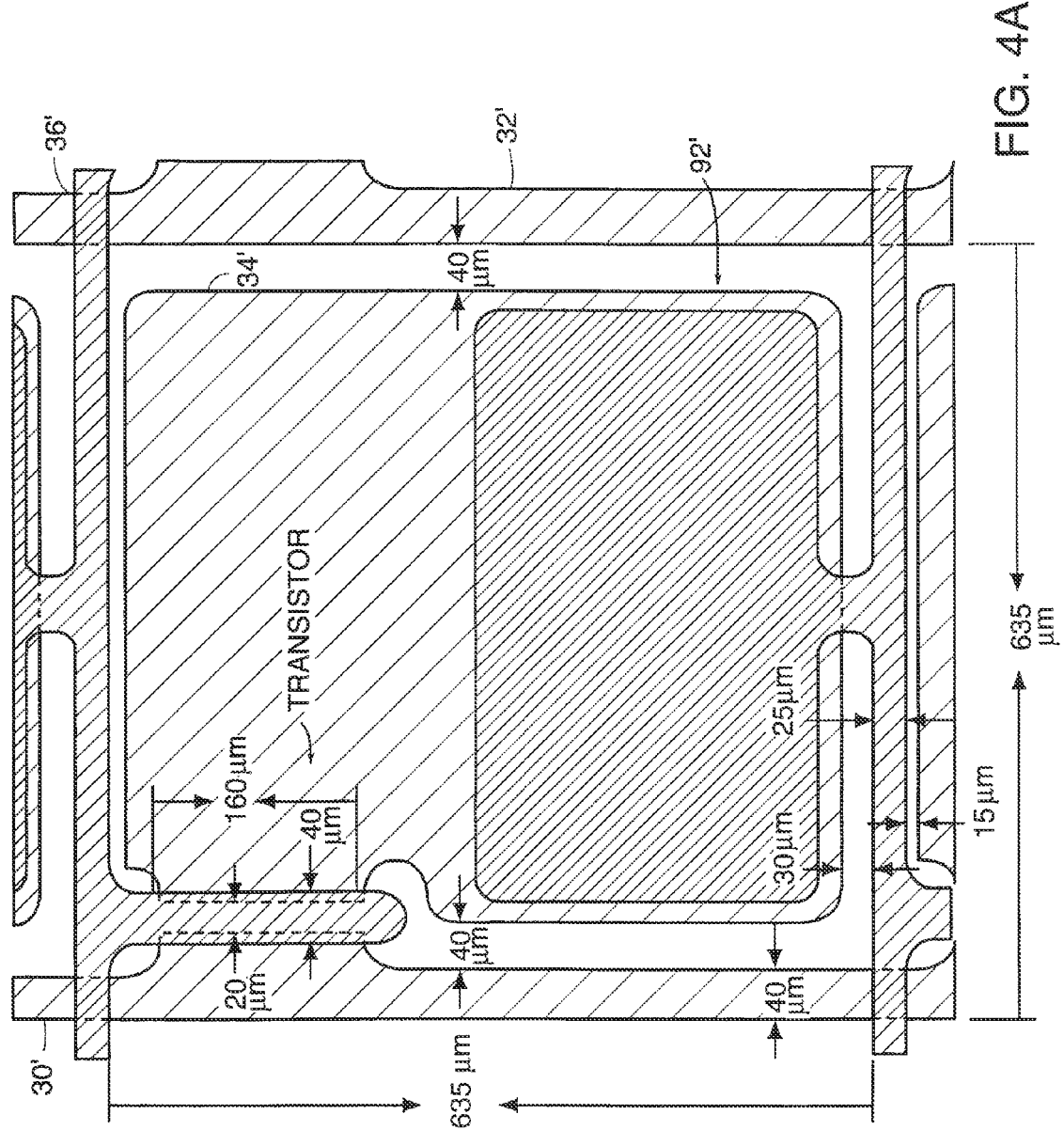
FIG. 4A shows a plan (or top) view of an embodiment of a thin-film transistor.

An exemplary embodiment of a thin-film transistor and a thin film capacitor for use in an encapsulated electrophoretic display is shown in FIG. 4A in plan view. Referring to FIG. 4A, this exemplary embodiment includes data lines 30', 32', a selection line 36', a pixel electrode 34', and a capacitor 92'.

Figure 4B:
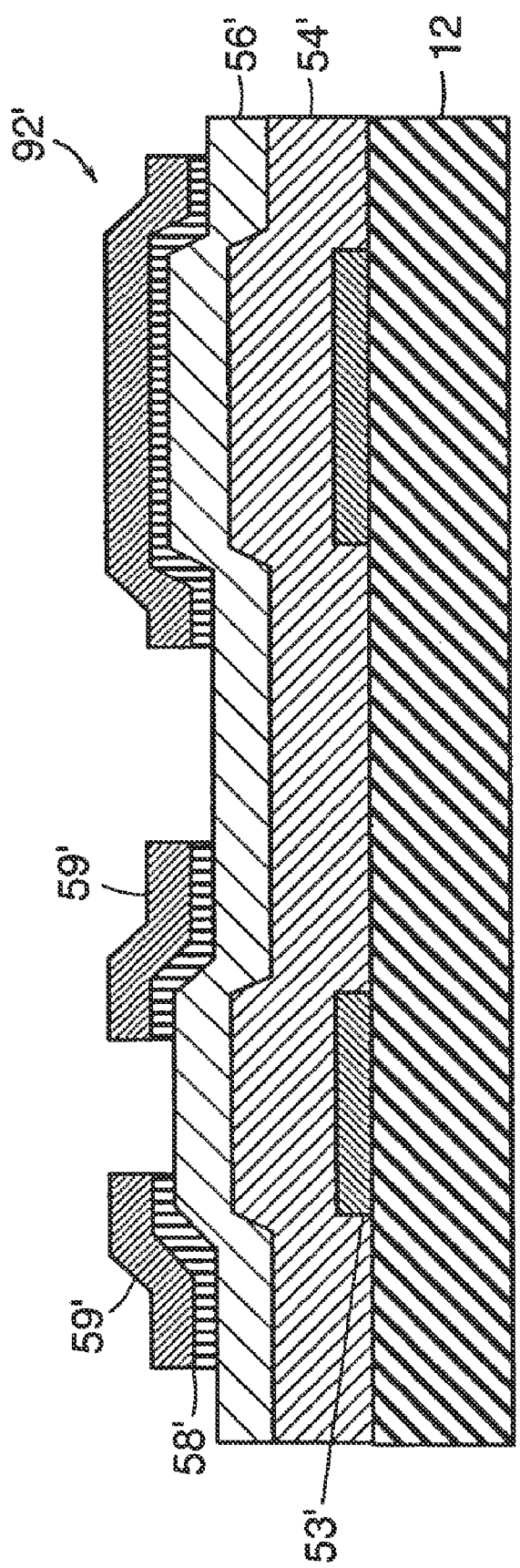
FIG. 4B shows a diagrammatic cross sectional view that corresponds to the transistor embodiment shown in FIG. 4A.

The embodiment of FIG. 4A is illustrated in cross section in FIG. 4B, though not to scale. Referring to FIG. 4B, the embodiment includes gate electrodes 53', a dielectric layer 54' which can be SiN or another dielectric material, a semiconductor layer 56' which can be amorphous silicon or another semiconductor material, semiconductor contacts 58', which can be made from amorphous silicon or another semiconductor material, to the drain and pixel electrodes 59'. Capacitor 92' is shown in this exemplary embodiment also with dielectric layer 54', semiconductor layer 56', semiconductor contact 58' and an electrode layer.

To illustrate the operating characteristics of the embodiment of FIGS. 4A and 4B, samples were prepared through either a two-mask process, as preferred, or a three-mask process, for comparison. In the two-mask process, the SiN dielectric layer 54' and the amorphous silicon layer 56' were not patterned while in the three mask process both the SiN dielectric layer 54' and the amorphous silicon layer 56' were patterned. The physical and experimentally measured electrical characteristics for these two samples are given in Table I.

TABLE I

| Sample | WL | On/Off Ratio | Mobility | Threshold Voltage | $G_m$ | Max. Drain Current | Min. Drain Current | Storage capacitance |
|---|---|---|---|---|---|---|---|---|
| Patterned | 200/20 | $1 \times 10^8$ | .55 cm²/Vs | 5.0 V | 18.9 nA/V² | 10 μA | 0.1 pA | 19.1 pF |
| Unpatterned | 160/20 | $3.3 \times 10^5$ | .43 cm²/Vs | 5.0 V | 23.4 nA/V² | 20 μA | 60 pA | 18.4 pF |

Figure 5:
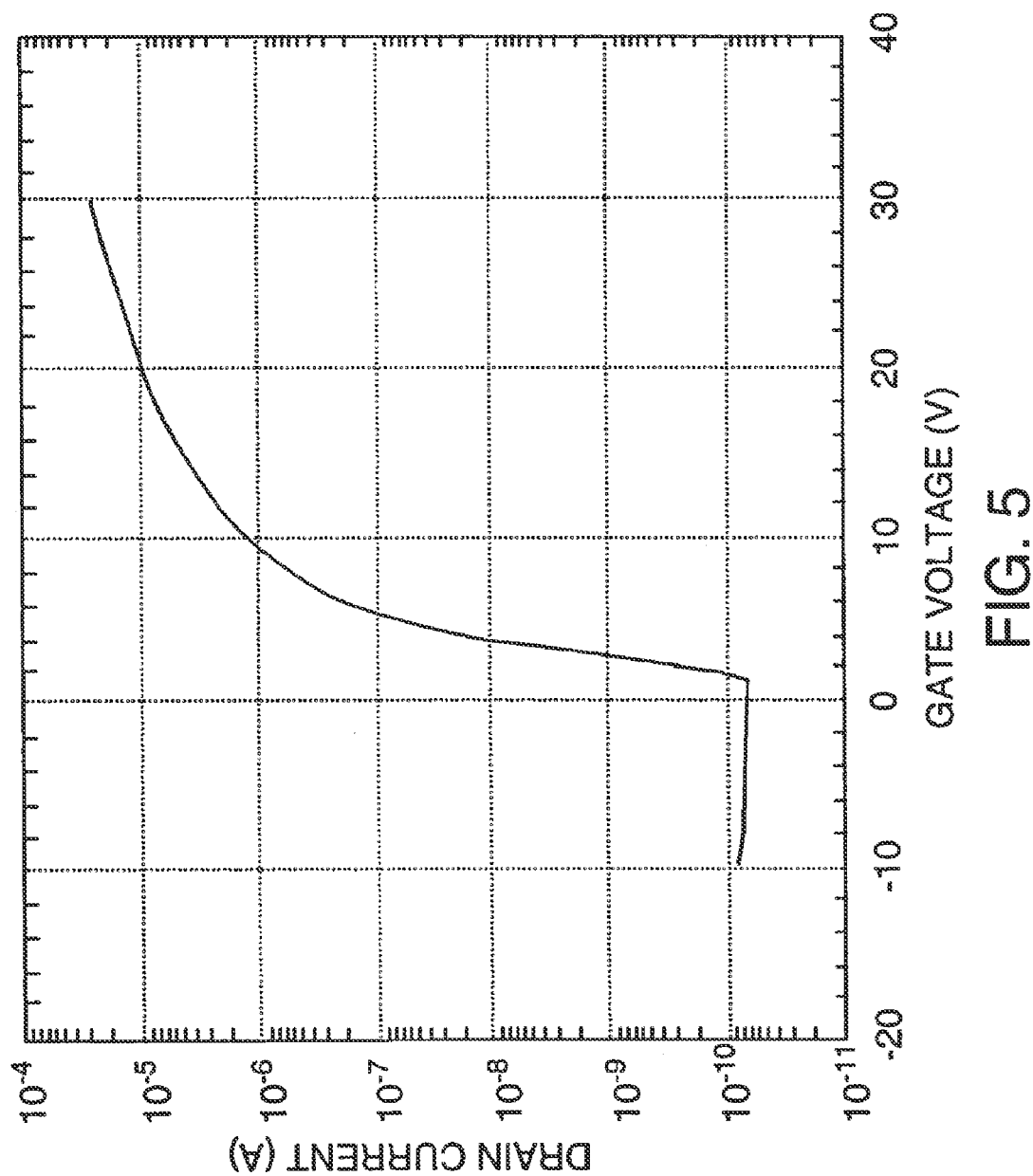
FIG. 5 shows a graph of drain current versus gate voltage for a sample of a two-mask transistor of the type shown in FIG. 4A.

The leakage current and On/Off ratio for the unpatterned sample, as expected, are poorer than for the patterned sample. The unpatterned sample, however, is both suitable and preferable for many display applications. Referring to FIG. 5, the drain current versus gate voltage characteristics of the two-mask sample are shown. The drain current can be caused to vary by over five orders of magnitude by changing the gate voltage from zero to 30 volts. This large range makes this transistor suitable for many display applications. Further alternative embodiments of a thin-film transistor array can be employed, as will be recognized by those of ordinary skill in the electronic display arts.

As mentioned before, the display can be an electrophoretic display. Electrophoretic displays have been the subject of intense research and development for a number of years. Electrophoretic displays have attributes of good brightness and contrast, wide viewing angles, state bistability, and low power consumption when compared with liquid crystal displays. Nevertheless, problems with the long-term image quality of these displays have prevented their widespread usage. For example, particles that make up such displays tend to cluster and settle, resulting in inadequate service-life for these displays.

An encapsulated, electrophoretic display typically does not suffer from the clustering and settling failure mode of traditional electrophoretic devices and provides further advantages, such as the ability to print or coat the display on a wide variety of flexible and rigid substrates. Use of the word "printing" is intended to include all forms of printing and coating, including, but without limitation: premetered coatings such as patch die coating, slot or extrusion coating, slide or cascade coating, and curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; and other similar techniques. Thus, the resulting display can be flexible. Further, because the display media can be printed (using a variety of methods), the display itself can be made inexpensively.

In broad overview, the invention relates to encapsulated electrophoretic displays that provide a flexible, reflective display that can be manufactured easily and consume little power (or no power in the case of bistable displays in certain states), as well as materials and methods useful in their construction. Such displays, therefore, can be incorporated into a variety of applications. The display can be formed from and can include particles that move in response to an electric charge. This mode of operation is typical in the field of electrophoretics. A display in which the particles, ordered by an electric charge, take on a certain configuration can take on many forms. Once the electric field is removed, the particles can be generally stable (e.g., bistable). Additionally, providing a subsequent electric charge can alter a prior configuration of particles. Some encapsulated electrophoretic displays may include two or more different types of particles. Such displays may include, for example, displays containing a plurality of anisotropic particles and a plurality of second particles in a suspending fluid. Application of a first electric field may cause the anisotropic particles to assume a specific orientation and present an optical property. Application of a second electric field may then cause the plurality of second particles to translate, thereby disorienting the anisotropic particles and disturbing the optical property. Alternatively, the orientation of the anisotropic particles may allow easier translation of the plurality of second particles. The particles may have a refractive index that substantially matches the refractive index of the suspending fluid.

An encapsulated electrophoretic display can be constructed so that the optical state of the display is stable for some length of time. When the display has two states that are stable in this manner, the display is bistable. If more than two states of the display are stable, then the display is multistable. For the purpose of the present invention, the term bistable indicates a display in which any optical state remains fixed once the addressing voltage is removed. However, the definition of a bistable state depends upon the display's application. A slowly decaying optical state can be effectively bistable if the optical state is substantially unchanged over the required viewing time. For example, in a display that is updated every few minutes, a display image that is stable for hours or days is effectively bistable for a particular application. Thus, for purposes of the present invention, the term bistable also indicates a display with an optical state sufficiently long-lived so as to be effectively bistable for a particular application. Alternatively, it is possible to construct encapsulated electrophoretic displays in which the image decays quickly once the addressing voltage to the display is removed (i.e., the display is not bistable or multistable). Whether or not an encapsulated electrophoretic display is bistable, and its degree of bistability, can be controlled through appropriate chemical modification of the electrophoretic particles, the suspending fluid, the capsule, and binder materials.

An encapsulated electrophoretic display may take many forms. The display may include capsules dispersed in a binder. The capsules may be of any size or shape. The capsules may, for example, be spherical and may have diameters in the millimeter range or the micron range, but are preferably from about ten to about a few hundred microns. The capsules may be formed by an encapsulation technique. Particles may be encapsulated in the capsules. The particles may be two or more different types of particles. The particles may be colored, luminescent, light-absorbing or transparent, for example. The particles may include neat pigments, dyed (laked) pigments or pigment/polymer composites, for example. The display may further include a suspending fluid in which the particles are dispersed.

Generally, an encapsulated electrophoretic display includes a capsule with one or more species of particle that either absorb or scatter light and that are suspended in a fluid. One example is a system in which the capsules contain one or more species of electrophoretically mobile particles dispersed in a dyed suspending fluid. Another example is a system in which the capsules contain two separate species of particles suspended in a clear suspending fluid, in which one species of particle absorbs light (black), while the other species of particle scatters light (white). There are other extensions (more than two species of particles, with or without a dye, etc.). The particles are commonly solid pigments, dyed particles, or pigment/polymer composites.

In electrophoretic displays, the particles may be oriented or translated by placing an electric field across the capsule. The electric field may include an alternating-current field or a direct-current field. The electric field may be provided by at least one pair of electrodes disposed adjacent to a display comprising the capsule.

The successful construction of an encapsulated electrophoretic display requires the proper interaction of all these materials and processes. Materials such as a polymeric binder (for example, for binding the capsules to a substrate), electrophoretic particles, fluid (for example, to surround the electrophoretic particles and provide a medium for migration), and a capsule membrane (for example, for enclosing the electrophoretic particles and fluid) must all be chemically compatible. The capsule membranes may engage in useful surface interactions with the electrophoretic particles, or may act as an inert physical boundary between the fluid and the binder. Polymer binders may set as adhesives between capsule membranes and electrode surfaces.

Materials for use in creating electrophoretic displays relate to the types of materials, including, but not limited to, particles, dyes, suspending fluids, and binders used in fabricating the displays. In one embodiment, types of particles that may be used to fabricate suspended particle displays include scattering pigments, absorbing pigments and luminescent particles. Such particles may also be transparent. Exemplary particles include titania, which may be coated in one or two layers with a metal oxide, such as aluminum oxide or silicon oxide, for example. Such particles may be constructed as corner cubes. Luminescent particles may include, for example, zinc sulfide particles. The zinc sulfide particles may also be encapsulated with an insulative coating to reduce electrical conduction. Light-blocking or absorbing particles may include, for example, dyes or pigments. Types of dyes for use in electrophoretic displays are commonly known in the art. Useful dyes are typically soluble in the suspending fluid, and may further be part of a polymeric chain. Dyes may be polymerized by thermal, photochemical, and chemical diffusion processes. Single dyes or mixtures of dyes may also be used.

A suspending (i.e., electrophoretic) fluid may be a high resistivity fluid. The suspending fluid may be a single fluid, or it may be a mixture of two or more fluids. The suspending fluid, whether a single fluid or a mixture of fluids, may have its density substantially matched to that of the particles within the capsule. The suspending fluid may be halogenated hydrocarbon, such as tetrachloroethylene, for example. The halogenated hydrocarbon may also be a low molecular weight polymer. One such low molecular weight polymer is poly (chlorotrifluoroethylene). The degree of polymerization for this polymer may be from about 2 to about 10.

Furthermore, capsules may be formed in, or later dispersed in, a binder. Materials for use as binders include water-soluble polymers, water-dispersed polymers, oil-soluble polymers, thermoset polymers, thermoplastic polymers, and uv- or radiation-cured polymers.

In some cases, a separate encapsulation step of the process is not necessary. The electrophoretic fluid may be directly dispersed or emulsified into the binder (or a precursor to the binder material) to form what may be called a "polymer-dispersed electrophoretic display." In such displays, the individual electrophoretic phases may be referred to as capsules or microcapsules even though no capsule membrane is present. Such polymer-dispersed electrophoretic displays are considered to be subsets of encapsulated electrophoretic displays.

In an encapsulated electrophoretic display, the binder material surrounds the capsules and separates the two bounding electrodes. This binder material must be compatible with the capsule and bounding electrodes and must possess properties that allow for facile printing or coating. It may also possess barrier properties for water, oxygen, ultraviolet light, the electrophoretic fluid, or other materials. Further, it may contain surfactants and cross-linking agents, which could aid in coating or durability. The polymer-dispersed electrophoretic display may be of the emulsion or phase separation type.

Figure 6A:
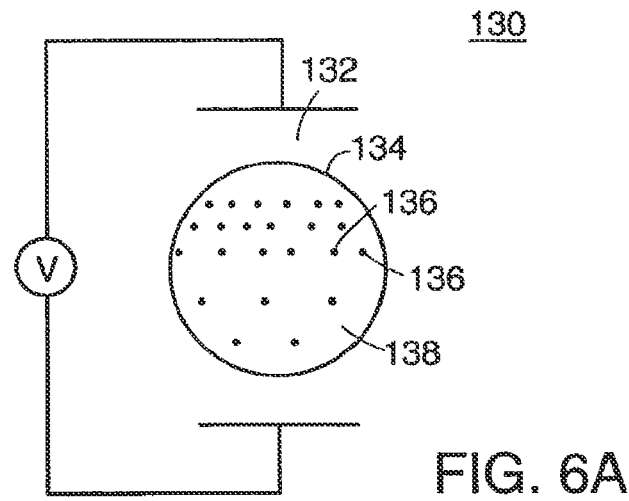
FIG. 6A shows a diagrammatic cross-sectional view of an electronic display according to one embodiment of the present invention.

Referring to FIG. 6A, an embodiment of an electrophoretic display that employs a thin-film transistor array of the present invention is shown. FIG. 6A shows a diagrammatic cross-section of an electrophoretic display 130 constructed using electronic ink. The binder 132 includes at least one capsule 134, which is filled with a plurality of particles 136 and a dyed suspending fluid 138. In one embodiment, the particles 136 are titania particles. When a direct-current electric field of the appropriate polarity is applied across the capsule 134, the particles 136 move to the viewed surface of the display and scatter light. When the applied electric field is reversed, the particles 136 move to the rear surface of the display and the viewed surface of the display then appears dark.

Figure 6B:
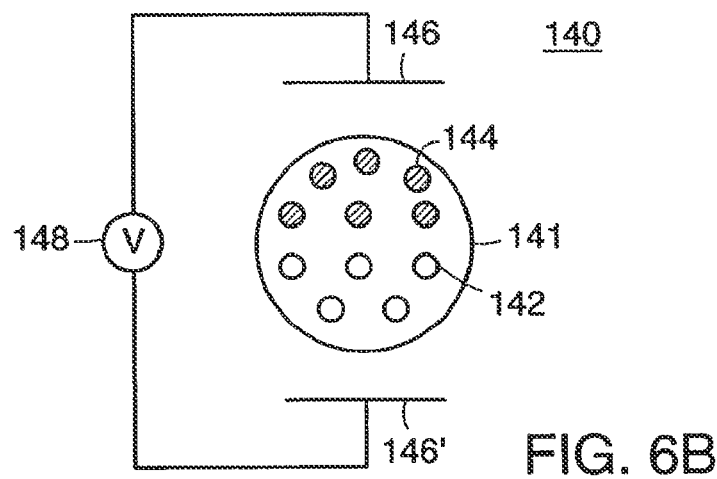
FIG. 6B shows a diagrammatic cross-sectional view of an electronic display according to another embodiment of the present invention.

FIG. 6B shows a cross-section of another electrophoretic display 140 constructed using electronic ink. This display comprises a first set of particles 142 and a second set of particles 144 in a capsule 141. The first set of particles 142 and the second set of particles 144 have contrasting optical properties. For example, the first set of particles 142 and the second set of particles 144 can have differing electrophoretic mobilities. In addition, the first set of particles 142 and the second set of particles 144 can have contrasting colors. For example, the first set of particles 142 can be white, while the second set of particles 144 can be black. The capsule 141 further includes a substantially clear fluid. The capsule 141 has electrodes 146 and 146' disposed adjacent it. The electrodes 146, 146' are connected to a source of voltage 148, which may provide an electric field to the capsule 141. In one embodiment, upon application of an electric field across the electrodes 146, 146', the first set of particles 142 move toward electrode 146', while the second set of particles 144 move toward electrode 146. In another embodiment, upon application of an electric field across the electrodes 146, 146', the first set of particles 142 move rapidly toward electrode 146', while the second set of particles 144 move only slowly or not at all towards electrode 146, so that the first set of particles packs preferentially at the microcapsule surface adjacent to electrode 146'.

Figure 6C:
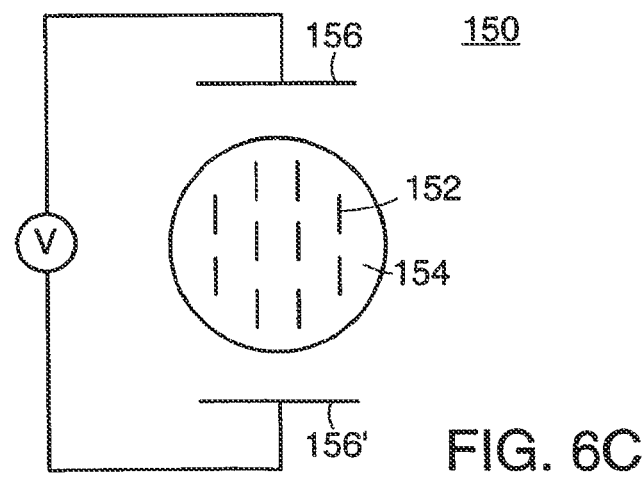
FIG. 6C shows a diagrammatic cross-sectional view of an electronic display according to a further embodiment of the present invention.

FIG. 6C shows a diagrammatic cross-section of a suspended particle display 150. The suspended particle display 150 includes needle-like particles 152 in a transparent fluid 154. The particles 152 change their orientation upon application of an AC field across the electrodes 156, 156'. When the AC field is applied, the particles 152 are oriented perpendicular with respect to the display surface and the display appears transparent. When the AC field is removed, the particles 152 are randomly oriented and the display 150 appears opaque.

The electrophoretic and suspended particle displays provided in FIGS. 6A-6C are exemplary only, and other electrophoretic displays can be used in accordance with the present invention.

Figure 6D:
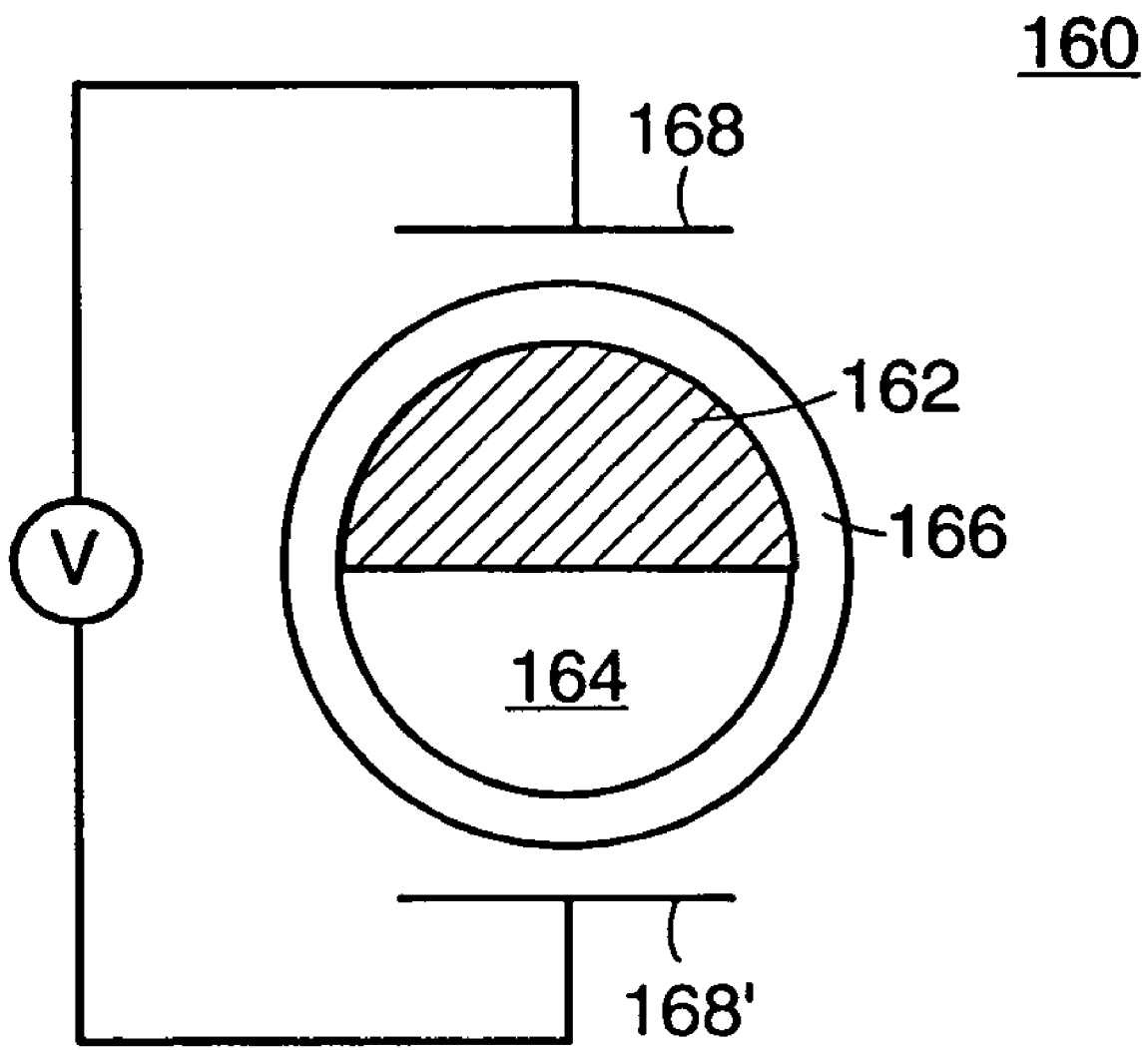
FIG. 6D shows a diagrammatic cross-sectional view of an electronic display according to yet another embodiment of the present invention.

In another detailed embodiment, the display medium 106 can comprise a plurality of bichromal spheres shown in FIG. 6D. A bichromal sphere 160 typically comprises a positively charged hemisphere 162 of a first color and a negatively charged hemisphere 164 of a second color in a liquid medium 166. Upon application of an electric field across the sphere 160 through a pair of electrodes 168, 168', the sphere 160 rotates and displays the color of one of the two hemispheres 162, 164.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

The invention claimed is:

1. An electronic display comprising:
an encapsulated display medium comprising a plurality of electrophoretic particles and a fluid dispersed as a plurality of droplets in a binder;
a plurality of transistors, each transistor having a data line, a gate electrode and a pixel electrode and comprising a layer of insulating material of the transistor situated between a first layer of conductive material of the transistor that forms the gate electrode and a second layer of conductive material of the transistor that forms the data and pixel electrodes, each transistor applying an addressing voltage to the display medium by charging the pixel electrode;
a plurality of storage capacitors, one storage capacitor being associated with each transistor, each storage capacitor comprising a layer of insulating material of the storage capacitor situated between a first layer of conductive material of the storage capacitor and a second layer of conductive material of the storage capacitor, said storage capacitor in electrical communication with the pixel addressed by the transistor for reducing the rate of voltage decay across the pixel after the addressing voltage is terminated, the first layer of conductive material and the layer of insulating material of each storage capacitor being disposed on the opposed side of the pixel electrode of its associated transistor from the display medium; and
a plurality of capacitor lines, each capacitor line being connected to the first layer of conductive material of at least one storage capacitor for applying a voltage thereto, the capacitor lines not being connected to any gate electrode.

2. An electronic display according to claim 1 further comprising a front electrode on the opposed side of the display medium from the pixel electrodes, the capacitor lines being connected to the front electrode.

3. An electronic display according to claim 1 wherein the layer of insulating material of the transistors and the layer of insulating material of the storage capacitors comprise parts of a single continuous layer of insulating material.

4. An electronic display according to claim 1 wherein the second layer of conductive material of each storage capacitor is formed by a part of the pixel electrode of its associated storage capacitor.

5. An electronic display comprising:
an encapsulated display medium comprising a plurality of electrophoretic particles and a dyed fluid in at least one capsule;
a plurality of transistors, each transistor having a data line, a gate electrode and a pixel electrode and comprising a layer of insulating material of the transistor situated between a first layer of conductive material of the transistor that forms the gate electrode and a second layer of conductive material of the transistor that forms the data and pixel electrodes, each transistor applying an addressing voltage to the display medium by charging the pixel electrode;
a plurality of storage capacitors, one storage capacitor being associated with each transistor, each storage capacitor comprising a layer of insulating material of the storage capacitor situated between a first layer of conductive material of the storage capacitor and a second layer of conductive material of the storage capacitor, said storage capacitor in electrical communication with the pixel addressed by the transistor for reducing the rate of voltage decay across the pixel after the addressing voltage is terminated, the first layer of conductive material and the layer of insulating material of each storage capacitor being disposed on the opposed side of the pixel electrode of its associated transistor from the display medium; and
a plurality of capacitor lines, each capacitor line being connected to the first layer of conductive material of at least one storage capacitor for applying a voltage thereto, the capacitor lines not being connected to any gate electrode.

6. An electronic display according to claim 5 further comprising a front electrode on the opposed side of the display medium from the pixel electrodes, the capacitor lines being connected to the front electrode.

7. An electronic display according to claim 5 wherein the layer of insulating material of the transistors and the layer of insulating material of the storage capacitors comprise parts of a single continuous layer of insulating material.

8. An electronic display according to claim 5 wherein the second layer of conductive material of each storage capacitor is formed by a part of the pixel electrode of its associated storage capacitor.

9. An electronic display comprising:
an encapsulated display medium comprising a first set of electrophoretic particles and a second set of electrophoretic particles, the first and second sets of electrophoretic particles having contrasting optical properties and differing electrophoretic mobilities, the first and second sets of particles being disposed in a substantially clear fluid in at least one capsule;
a plurality of transistors, each transistor having a data line, a gate electrode and a pixel electrode and comprising a layer of insulating material of the transistor situated between a first layer of conductive material of the transistor that forms the gate electrode and a second layer of conductive material of the transistor that forms the data and pixel electrodes, each transistor applying an addressing voltage to the display medium by charging the pixel electrode;
a plurality of storage capacitors, one storage capacitor being associated with each transistor, each storage capacitor comprising a layer of insulating material of the storage capacitor situated between a first layer of conductive material of the storage capacitor and a second layer of conductive material of the storage capacitor, said storage capacitor in electrical communication with the pixel addressed by the transistor for reducing the rate of voltage decay across the pixel after the addressing voltage is terminated, the first layer of conductive material and the layer of insulating material of each storage capacitor being disposed on the opposed side of the pixel electrode of its associated transistor from the display medium; and a plurality of capacitor lines, each capacitor line being connected to the first layer of conductive material of at least one storage capacitor for applying a voltage thereto, the capacitor lines not being connected to any gate electrode.

10. An electronic display according to claim 9 further comprising a front electrode on the opposed side of the display medium from the pixel electrodes, the capacitor lines being connected to the front electrode.

11. An electronic display according to claim 9 wherein the layer of insulating material of the transistors and the layer of insulating material of the storage capacitors comprise parts of a single continuous layer of insulating material.

12. An electronic display according to claim 9 wherein the second layer of conductive material of each storage capacitor is formed by a part of the pixel electrode of its associated storage capacitor.

13. An electronic display comprising:

an encapsulated display medium;

a plurality of transistors, each transistor having a data line, a gate electrode and a pixel electrode and comprising a layer of insulating material of the transistor situated between a first layer of conductive material of the transistor that forms the gate electrode and a second layer of conductive material of the transistor that forms the data and pixel electrodes, each transistor applying an addressing voltage to the display medium by charging the pixel electrode;

a plurality of storage capacitor electrodes, one storage capacitor electrode being associated with each transistor, each storage capacitor electrode forming a capacitor with the pixel electrode of its associated transistor with a layer of insulating material being situated between the storage capacitor electrode and its associated pixel electrode, said storage capacitor serving to reduce the rate of voltage decay across the pixel after the addressing voltage is terminated, a portion of the pixel electrode being disposed between its associated storage capacitor electrode and the encapsulated display medium; and a plurality of capacitor lines, each capacitor line being connected to at least one storage capacitor electrode for applying a voltage thereto, the capacitor lines not being connected to any gate electrode.

14. An electronic display according to claim 13 further comprising a front electrode on the opposed side of the display medium from the pixel electrodes, the capacitor lines being connected to the front electrode.

15. An electronic display according to claim 1 wherein the layer of insulating material of the transistors and the layer of insulating material a layer of insulating material situated between the storage capacitor electrodes and their associated pixel electrodes comprise parts of a single continuous layer of insulating material.

* * * * *